US011894204B2

(12) United States Patent
Schmid et al.

(10) Patent No.: US 11,894,204 B2
(45) Date of Patent: Feb. 6, 2024

(54) SWITCH ASSEMBLY WITH DRIVE SYSTEM

(71) Applicant: Maschinenfabrik Reinhausen GmbH, Regensburg (DE)

(72) Inventors: Sebastian Schmid, Sinzing (DE); Benjamin Dittmann, Neutraubling (DE); Eugen Nagel, Regensburg (DE)

(73) Assignee: MASCHINENFABRIK REINHAUSEN GMBH, Regensburg (DE)

(*) Notice: Subject to any disclaimer, the term of this patent is extended or adjusted under 35 U.S.C. 154(b) by 102 days.

(21) Appl. No.: 17/611,210

(22) PCT Filed: Apr. 23, 2020

(86) PCT No.: PCT/EP2020/061274
§ 371 (c)(1),
(2) Date: Nov. 15, 2021

(87) PCT Pub. No.: WO2020/229119
PCT Pub. Date: Nov. 19, 2020

(65) Prior Publication Data

US 2022/0216015 A1 Jul. 7, 2022

(30) Foreign Application Priority Data

May 15, 2019 (DE) ..................... 10 2019 112 710.6

(51) Int. Cl.
*H01H 3/26* (2006.01)
*H01H 9/00* (2006.01)

(52) U.S. Cl.
CPC ............ *H01H 3/26* (2013.01); *H01H 9/0027* (2013.01); *H01H 2003/266* (2013.01)

(58) Field of Classification Search
CPC ...... H01H 3/26; H01H 3/40; H01H 2003/266; H01H 9/0027; H02P 13/06
(Continued)

(56) References Cited

U.S. PATENT DOCUMENTS

2001/0020834 A1* 9/2001 Berkowitz ............. H02H 7/222 318/272
2004/0065533 A1 4/2004 Schwesig et al.
(Continued)

FOREIGN PATENT DOCUMENTS

DE 19963256 C1 5/2001
DE 10235502 C1 12/2003
(Continued)

*Primary Examiner* — Edwin A. Leon
*Assistant Examiner* — Iman Malakooti
(74) *Attorney, Agent, or Firm* — LEYDIG VOIT & MAYER LTD.

(57) ABSTRACT

A switch assembly includes a switch and a servo drive system. The drive system includes: a drive shaft connecting the drive system to the switch; a motor driving the switch; a power section supplying power to the motor; a feedback system; and a programmable safety controller. The feedback system determines at least two values for an absolute position of the drive shaft; and generates a feedback signal on the basis of the values. The controller controls the power section depending on at least one desired value; influences an operation of the motor depending on the feedback signal; and identifies the presence of at least one safety-relevant event, and based thereon, transmits a control signal to the power section. The power section is initiates/carries-out at a safety measure depending on the control signal.

16 Claims, 2 Drawing Sheets

(58) Field of Classification Search
USPC .................................... 200/237, 400; 361/62
See application file for complete search history.

(56) References Cited

U.S. PATENT DOCUMENTS

| | | | | |
|---|---|---|---|---|
| 2005/0168891 | A1 | 8/2005 | Nilman-Johansson et al. | |
| 2015/0061806 | A1* | 3/2015 | Teising ............. | H01H 33/6661<br>336/150 |

FOREIGN PATENT DOCUMENTS

| | | | |
|---|---|---|---|
| EP | 1744338 | A1 | 1/2007 |
| WO | WO 9952121 | A1 | 10/1999 |
| WO | WO 0036621 | A1 | 6/2000 |
| WO | WO 2008024048 | A1 | 2/2008 |
| WO | WO 2012135209 | A1 | 10/2012 |

* cited by examiner

SWITCH ASSEMBLY WITH DRIVE SYSTEM

CROSS REFERENCE TO RELATED APPLICATIONS

This application is a U.S. National Phase application under 35 U.S.C. § 371 of International Application No. PCT/EP2020/061274, filed on Apr. 23, 2020, and claims benefit to German Patent Application No. DE 10 2019 112 710.6, filed on May 15, 2019. The International Application was published in German on Nov. 19, 2020 as WO 2020/229119 A1 under PCT Article 21(2).

FIELD

The present invention relates to a switch assembly with a drive system for the switch.

BACKGROUND

In substations, there are a large number of switches for different tasks and with different requirements. To operate the various switches, they must be driven via a drive system. These switches include, amongst others, on-load tap-changers, diverter switches, selectors, double reversing change-over selectors, reversing change-over selectors, change-over selectors, circuit breakers, on-load switches or disconnecting switches.

For example, on-load tap-changers are used for uninterrupted switchover between different winding taps of an item of electrical equipment, such as a power transformer or a controllable reactor. For example, this makes it possible for the transmission ratio of the transformer or the inductance of the reactor to be changed. Double reversing change-over selectors are used to reverse the polarity of windings during power transformer operation.

All of these switches represent a highly safety-relevant component of the electrical equipment, because the switchover takes place while the equipment is in operation and is accordingly connected to a power network, for example. In extreme cases, malfunctions during operation can have serious technical and economic consequences.

SUMMARY

In an embodiment, the present disclosure provides a switch assembly that includes a switch; and a servo drive system for driving the switch. The servo drive system includes: a drive shaft connecting the servo drive system to the switch; a motor configured to drive the switch; a power section configured to supply power to the motor; a feedback system; and a control unit. The feedback system is configured to: determine at least two values for an absolute position of the drive shaft; generate a feedback signal on the basis of the at least two values. The control unit, which is a programmable safety controller, is configured to: control the power section depending on at least one desired value; influence an operation of the motor depending on the feedback signal; and identify the presence of at least one safety-relevant event and, in the case of identifying the presence of the safety-relevant event, to transmit at least one control signal to the power section. The power section is configured to initiate or carry out at least one safety measure depending on the control signal.

BRIEF DESCRIPTION OF THE DRAWINGS

Subject matter of the present disclosure will be described in even greater detail below based on the exemplary figures.

All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
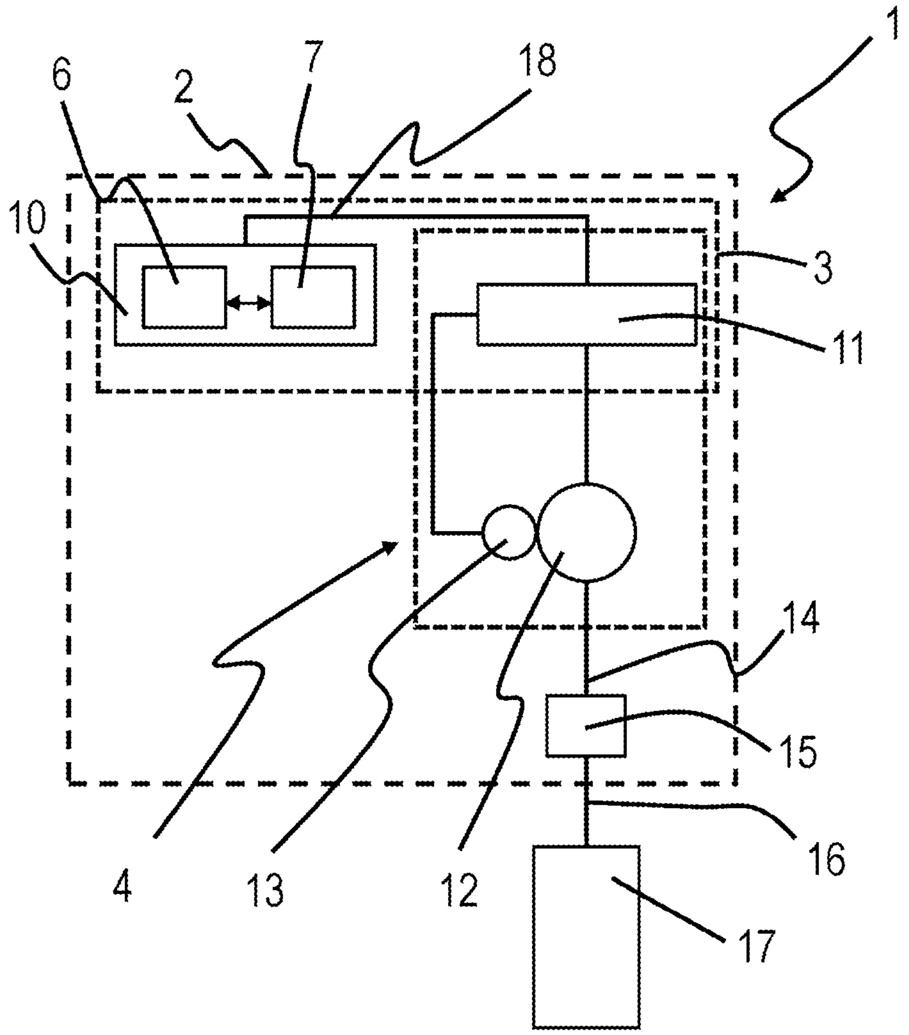
FIG. 1 a schematic representation of an exemplary embodiment of a switch assembly according to the improved concept.

Embodiments of the present invention provide an improved concept for driving a switch, in particular an on-load tap-changer, diverter switch, selector, double reversing change-over selector, reversing change-over selector, change-over selector, circuit breaker, on-load switch or disconnecting switch, by means of which concept the operational reliability is increased.

An embodiment of the present invention relates to a switch assembly, in particular a tap changer assembly, having a switch, in particular an on-load tap-changer, and a servo drive system for the switch, in particular the on-load tap-changer.

According to an embodiment of the improved concept, a switch assembly comprising a switch and a servo drive system for the switch is provided. The servo drive system has a drive shaft connecting the servo drive system to the switch, a motor for driving the drive shaft, a power section for supplying power to the motor, a control unit and a feedback system. The feedback system is designed to determine at least two values for an absolute position of the drive shaft and to generate a feedback signal based on the at least two values. The control unit is embodied as a programmable safety controller and is designed to control the power section depending on at least one desired value. Furthermore, the control unit is designed to influence the operation of the motor depending on the feedback signal, to identify the presence of at least one safety-relevant event and, in the event of the safety-relevant event, to transmit at least one control signal to the power section. The power section is designed to initiate or carry out at least one safety measure depending on the control signal.

The expression "values for the position of the drive shaft" also includes those values of measurement variables from which the position of the drive shaft can be unambiguously determined, if necessary within a tolerance range.

By determining at least two values for the position of the drive shaft, the control device can carry out a plausibility check of the position determination or a reconciliation of the two values and can thereby increase the reliability of the position determination and reduce the corresponding residual risk of an incorrect position determination. In addition, a partial failure of the feedback device, such that only one value can still be determined for the position of the drive shaft, does not necessarily lead to the immediate stopping of the drive shaft. At least the switch, in particular the on-load tap-changer, diverter switch, selector, double reversing change-over selector, reversing change-over selector, change-over selector, circuit breaker, on-load switch or disconnecting switch, can still be moved into a safe operating position in a controlled manner despite the partial failure. Ultimately, this increases the operational reliability of the servo drive system, the switch, in particular the on-load tap-changer, diverter switch, selector, double reversing change-over selector, reversing change-over selector, change-over selector, circuit breaker, on-load switch or disconnecting switch, and of the equipment.

According to at least one embodiment, the switch is configured as an on-load tap-changer, a diverter switch, a selector, a double reversing change-over selector, a reversing change-over selector, a change-over selector, circuit breaker, an on-load switch or a disconnecting switch.

According to at least one embodiment, the servo drive system is used to drive a shaft of the switch, in particular on-load tap-changer, diverter switch, selector, double reversing change-over selector, reversing change-over selector, change-over selector, circuit breaker, on-load switch or disconnecting switch, or a corresponding component of the switch, in particular on-load tap-changer, diverter switch, selector, double reversing change-over selector, reversing change-over selector, change-over selector, circuit breaker, on-load switch or disconnecting switch. This causes the switch, in particular on-load tap-changer, diverter switch, selector, double reversing change-over selector, reversing change-over selector, change-over selector, circuit breaker, on-load switch or disconnecting switch, to perform one or more operations, such as a switchover between two winding taps of an item of equipment or parts of the switchover, such as a diverter switch operation, selector operation, or change-over selector operation.

According to at least one embodiment, the drive shaft is connected directly or indirectly, in particular via one or more gear units, to the switch, in particular to the shaft of the switch.

According to at least one embodiment, the drive shaft is connected directly or indirectly, in particular via one or more gears, to the motor, in particular to a motor shaft of the motor.

According to at least one embodiment, a position, in particular an absolute position, of the motor shaft corresponds to a position, in particular an absolute position, of the drive shaft. This means that the position of the drive shaft can be unambiguously deduced from the position of the motor shaft, if necessary within a tolerance range.

According to at least one embodiment, the influence includes open-loop control, closed-loop control, braking, acceleration, or stopping of the motor. For example, the closed-loop control may include position control, speed control, acceleration control, or torque control.

According to at least one embodiment, the power section is designed as a converter or servo converter or as an equivalent electronic unit, in particular fully electronic unit, for drive machines.

According to various embodiments, the control device contains all or part of the feedback system.

According to at least one embodiment, the feedback system is designed to determine a first value of the at least two values for the position of the drive shaft according to a first method and to determine a second value of the at least two values for the position of the drive shaft according to a second method, wherein the two methods differ from each other. This creates a diverse redundancy that further increases operational reliability.

For example, the two methods may be based on different technical or physical principles or may use different hardware components.

According to at least one embodiment, one of the at least two values for the position of the drive shaft is a first value for an absolute position of the drive shaft.

According to at least one embodiment, another of the at least two values for the position of the drive shaft is a second value for an absolute position of the drive shaft.

According to at least one embodiment, one of the at least two values for the position of the drive shaft is an incremental value for a position of the drive shaft or a value for a relative position of the drive shaft.

The first and/or the second value for the absolute position can then be compared by the control unit with the incremental or relative value, whereby the plausibility of the first and/or second value for the absolute position can be checked. In the event of a significant deviation, the control unit can output the control signal to the power section to initiate the safety measure.

According to at least one embodiment, the feedback system is designed to determine a rotor position of the motor and to determine one of the at least two values for the position of the drive shaft depending on the rotor position.

According to at least one embodiment, the rotor position is an angular range in which a rotor of the motor is located, optionally combined with a number of complete rotations of the rotor.

Depending on the design of the rotor, in particular the number of pole pairs, the position or absolute position of the motor shaft can thus be determined accurately up to at least 180°, for example by the control unit. By reduction by means of one or more gears, the accuracy of the position of the drive shaft that can be achieved as a result is significantly greater. In this case, the evaluation by the control unit corresponds to a virtual encoder function, so to speak. Even in the event of a complete failure of an absolute encoder of the feedback system, at least one emergency mode can therefore be maintained and/or the switch can be brought into a safe position.

According to at least one embodiment, the feedback system includes an absolute encoder that is designed and arranged to detect the absolute position of the drive shaft or an absolute position of another shaft that is connected to the drive shaft and to generate at least one output signal based on the detected position. The feedback system is designed to determine one of the at least two values for the position of the drive shaft, in particular the first and/or the second value for the absolute position, on the basis of the at least one output signal.

According to at least one embodiment, the absolute encoder is directly or indirectly attached to the motor shaft, the drive shaft, or a shaft coupled thereto.

According to at least one embodiment, the absolute encoder has a first output for outputting the first or second value for the absolute position and a second output for outputting the incremental or relative value for the position.

The expression "absolute encoder" includes both devices that determine two values for the position in different ways, and devices that contain two separate encoders, at least one of which is an absolute encoder.

According to at least one embodiment, the absolute encoder comprises a multi-turn encoder.

According to at least one embodiment, the absolute encoder is configured to detect the position of the drive shaft or the position of the further shaft on the basis of a first sampling method.

According to at least one embodiment, the absolute encoder is designed to additionally detect the position of the drive shaft or the position of the further shaft on the basis of a second sampling method that is independent of the first sampling method.

According to at least one embodiment, the first or second sampling method includes an optical, a magnetic, a capacitive, a resistive, or an inductive sampling method.

According to at least one embodiment, the first sampling method differs from the second sampling method.

According to at least one embodiment, the absolute encoder is connected to the drive shaft, the motor shaft or the further shaft in an interlocked manner.

According to at least one embodiment, the absolute encoder is additionally connected to the drive shaft, the motor shaft or the further shaft in a frictionally engaged or integrally bonded manner, for example by means of an adhesive connection.

The interlocked and additional integrally bonded or frictionally engaged connection further increases the attachment of the absolute encoder and ultimately the operational reliability.

The programmable safety controller refers to a controller that contains two processor units, in particular two programmable logic controllers (PLCs). The two processor units use the same process image of inputs and outputs of the control unit and run in parallel a user program stored in the control unit.

According to at least one embodiment, the user program contains multiple instructions. When the instructions are executed by the control unit, this results in the power section being actuated in response to the desired value. This drives the motor, and ultimately the switch, to perform one or more operations, such as a switchover between two winding taps of an item of equipment, or parts of the switchover, such as, in the case of a switch configured as an on-load tap-changer, a diverter switch operation, selector operation, or change-over selector operation.

According to at least one embodiment, the control unit includes a first and a second processor unit. The control unit is designed to run a program, in particular the user program, in order to implement a switching command for the switch, wherein the first and second processor units run the program in parallel.

The use of the programmable safety controller as a control unit and the associated redundancy increase the operational reliability of the switch assembly.

According to at least one embodiment, the control unit is designed to perform at least one reconciliation between the first and the second processor unit during the running of the program, in particular a continuous reconciliation.

According to at least one embodiment, the reconciliation includes a comparison, in particular a cyclic comparison, of a process image of the first processor unit with a process image of the second processor unit.

According to at least one embodiment, the control unit is designed to initiate a further safety measure depending on a result, in particular in the event of a negative result of the at least one reconciliation or the comparison of the process images.

According to at least one embodiment, the safety measure or the further safety measure includes a safe stopping of the motor, a blocking or shutdown of the power section or a tripping of a circuit breaker that connects or disconnects the equipment to a power network. The motor is stopped safely in particular in such a way that the switch is in a safe position after the safe stopping. The initiation of the safety measure includes the output of at least one safety signal.

According to at least one embodiment, the safe stopping of the motor includes a safety function that corresponds to a stop category as defined in accordance with industry standard EN 60204-1:2006, the content of which is hereby incorporated by reference herein.

According to at least one embodiment, the safe stopping of the motor includes a safe-torque-off, STO, safety function, a safe-stop-1, SS1, safety function, a safe-stop-2, SS2, safety function, or a safe-operation-stop, SOS, safety function.

According to at least one embodiment, a hardware of the first processor unit is different from a hardware of the second processor unit.

This creates diverse redundancy, which further increases operational reliability.

According to at least one embodiment, the control unit is designed to check a locking condition of two or more components of the switch assembly.

The components of the switch assembly can include components of the switch, for example, in the case of a switch designed as an on-load tap-changer, a selector, a change-over selector, a tie-in circuit, or a diverter switch of the on-load tap-changer.

The components of the switch assembly may also include components that are not part of the switch, in particular components of another switch of the switch assembly or of another switching component of the switch assembly. For example, two switches that are configured as on-load tap-changers may be on-load tap-changers for different phases of the power network. The other switching components may include, for example, a de-energized tap-changer, a double reversing change-over selector, or an Advanced Retard Switch (ARS).

The locking condition can correspond to a specification that one of the components may only be actuated or may not be actuated if another of the components is in a certain state, for example a certain position, a certain switching state or a certain movement state.

According to at least one embodiment, the control unit is designed to initiate the safety measure depending on a result, in particular in the event of a negative result of the checking of the locking condition.

By checking the locking condition and, if necessary, initiating the safety measure, the operational reliability can be further increased without requiring specific design measures for the switch or the other components, such as mechanical or electromechanical systems, cam switches or the like.

According to at least one embodiment, the switch assembly, e.g., if this is an on-load tap-changer, a diverter switch, a selector, a double reversing change-over selector, a reversing change-over selector, a change-over selector, a circuit breaker, an on-load switch or a disconnecting switch, is associated with an item of electrical equipment, for example a power transformer or a phase shifter transformer.

According to at least one embodiment, the control unit has inputs and outputs which are designed as clocked inputs and outputs, respectively.

According to at least one embodiment, the control unit is designed to check for the presence of a cross-circuit on the basis of input signals present at the inputs and/or on the basis of output signals present at the outputs.

A cross-circuit is a short-circuit between the connecting leads of two adjacent inputs or outputs.

According to at least one embodiment, the control unit is designed to initiate the further safety measure depending on a result of the check, in particular if a cross-circuit is present.

By initiating the safety measure in the presence of a safety-relevant event or the further safety measure, the operational reliability of the switch assembly is increased.

According to at least one embodiment, the power section is designed to bring the motor to a stop, in particular to bring it to a stop safely, by a first of the at least one safety measures. The stopping can also include a movement within a defined tolerance range.

According to at least one embodiment, the safe stopping of the motor includes a safety function that corresponds to a stop category as defined in accordance with industry standard EN 60204-1:2006, the content of which is hereby incorporated by reference herein.

According to at least one embodiment, the safe stopping of the motor includes a safe-torque-off, STO, safety function, a safe-stop-1, SS1, safety function, a safe-stop-2, SS2, safety function, or a safe-operation-stop, SOS, safety function.

According to at least one embodiment, the safety measure includes monitoring a movement or a position of the motor, in particular a motor shaft of the motor.

According to at least one embodiment, monitoring the movement of the motor includes a safely-limited-speed, SLS, safety function, a safe-speed-monitor, SSM, safety function, a safe-speed-range, SSR, safety function, a safe-limit-position, SLP, safety function, a safe-position, SP, safety function, or a safe-direction, SDI, safety function.

According to at least one embodiment, the first safety measure includes an uncontrolled stopping of the motor.

According to at least one embodiment, the power section is designed to completely interrupt the power supply to the motor depending on the control signal. In particular, the first safety measure includes interrupting the power supply immediately or without delay. The power supply remains interrupted even when the motor is stopped, so that the motor can no longer provide torque (corresponds to STO).

According to at least one embodiment, the power section is designed to brake or stop the motor in a controlled manner depending on the control signal. The power supply to the motor is maintained during this time.

According to at least one embodiment, depending on the control signal, the power section is designed to completely interrupt the power supply to the motor after the controlled braking or stopping, so that the motor can no longer provide torque (corresponds to SS1).

According to at least one embodiment, depending on the control signal, the power section is designed to maintain the power supply to the motor after the controlled braking or stopping and to control a position of the motor, in particular of the motor shaft, to a desired position (corresponds to SS2).

According to at least one embodiment, in the event of a violation of a tolerance range with respect to the desired position, the power section is designed to initiate a further safety measure, in particular comprising an STO or an SS1 safety function.

According to at least one embodiment, the power section is designed to restrict a speed or rotational speed of the motor shaft by a second of the at least one safety measure.

According to at least one embodiment, the power section is designed to restrict the speed such that the speed is less than or equal to a predetermined maximum speed (corresponding to SLS or SSR).

According to at least one embodiment, the power section is designed to restrict the speed such that the speed is greater than or equal to a predetermined minimum speed (corresponding to SSM or SSR).

According to at least one embodiment, the power section is designed to initiate a further safety measure, in particular comprising an STO or an SS1 safety function, if the maximum speed is exceeded or the minimum speed is undershot.

According to at least one embodiment, the at least one safety-relevant event comprises a deviation of a direction of rotation of the motor, the motor shaft or a further shaft of the switch assembly from a predetermined desired direction of rotation (corresponds to SDI).

According to at least one embodiment, the direction of rotation is detected here by the feedback system, in particular an encoder device of the feedback system, for example the absolute encoder.

According to at least one embodiment, the control unit is designed to generate the control signal depending on the feedback signal.

According to at least one embodiment, the at least one safety-relevant event occurs when the absolute position of the motor shaft or the further shaft falls below a predetermined minimum position or exceeds a predetermined maximum position (corresponds to SLP).

According to at least one embodiment, the at least one safety-relevant event occurs when the first and the second value for the absolute position of the drive shaft differ significantly from each other. For this purpose, the control unit can compare with each other the first and the second value for the absolute position of the drive shaft.

In the following, the invention is explained in detail on the basis of exemplary embodiments with reference to the drawings. Components which are identical or functionally identical or which have an identical effect may be provided with identical reference signs. Identical components or components having an identical function may in some cases be explained only in relation to the figure in which they first appear. The explanation is not necessarily repeated in the subsequent figures.

FIG. 1 shows a schematic representation of an exemplary embodiment of a switch assembly 1 according to the improved concept with a switch 17 and a servo drive system 2, which is connected to the switch 17 via a drive shaft 16. The servo drive system 2 includes a motor 12, which can drive the drive shaft 16 via a motor shaft 14 and optionally via a gear unit 15. A control device 3 of the servo drive system 2 comprises a power section 11, which contains for example a servo converter, for the open-loop- or closed-loop-controlled power supply of the motor 12, and a control unit 10 for actuating the power section 11, for example via a bus 18.

The servo drive system 2 may have an encoder system 13, which serves as a feedback system 4 or is part of the feedback system and is connected to the power section 11. Furthermore, the encoder system 13 is directly or indirectly coupled to the drive shaft 16.

The encoder system 13 is designed to detect a value for a position, in particular an angular position, for example an absolute angular position, of the drive shaft 16 and to generate a feedback signal based thereon. For this purpose, the encoder system 13 can comprise, for example, an absolute encoder, in particular a multi-turn absolute encoder, which is attached to the drive shaft 16, the motor shaft 14 or another shaft of which the position is unambiguously linked to the absolute position of the drive shaft 16. For example, the position of the drive shaft 16 can be unambiguously determined from the position of the motor shaft 14, for example via a transmission ratio of the gear unit 15.

The fastening of the absolute encoder is embodied, for example, as a combination of an interlocked connection with a frictionally engaged or integrally bonded connection.

The feedback system is additionally adapted to detect a second value for the position of the drive shaft 16.

For this purpose, the encoder system 13 may be designed to detect the second value, in particular using a method which is different from a method according to which the first value for the position of the drive shaft 16 is detected.

Alternatively or additionally, the control device 3 can be designed to determine the second value from a rotor position of the motor 12, effectively thus having a virtual encoder for detecting the second value. For this purpose, for example, an inductive feedback may be utilized by the movement of the rotor in motor windings of the motor 12. Since a strength of the feedback varies periodically, signal analysis, for example FFT analysis, can be used to approximate the rotor position in particular. Since one full revolution of the drive shaft 16 corresponds to a plurality of revolutions of the rotor, the position of the drive shaft 16 can be inferred therefrom with much higher accuracy.

The control device 3, in particular the control unit 10 and/or the power section 11, is designed to control the motor 12 in an open-loop or closed-loop fashion depending on a feedback signal generated by the feedback system 4 on the basis of the first and second values.

The control device 3, for example the control unit 10, can, for example, reconcile the two values for the position of the drive shaft 16 and/or perform a plausibility check of the position determination.

The control unit 10 is designed as a programmable safety controller and includes, for example, a first and a second programmable logic controller 6, 7. To implement a switching command for the switch, the programmable logic controllers 6, 7 run a program in parallel, for example.

Whilst the program is being run, the programmable logic controllers 6, 7 can reconcile themselves with each other, in particular cyclically or continuously. The reconciliation can include, for example, a comparison of calculation results, checksums or the like.

For example, the programmable logic controllers 6, 7 contain different hardware components or are embodied as different types or models.

Inputs and outputs of the control unit 10 can be embodied as clocked inputs and outputs. This allows the control unit 10 to detect clock deviations, for example deviations in period durations or edges of the signals, based on a comparison of an input signal with an output signal. Based on the clock deviations, cross-circuits can be detected, for example.

The control unit 10 can identify the presence of a safety-relevant event, for example a malfunction or fault of the switch 17 or the drive system. If a safety-relevant event is present, the control unit 10 transmits a control signal to the power section 11, which then initiates or executes a safety measure.

Figure 2:
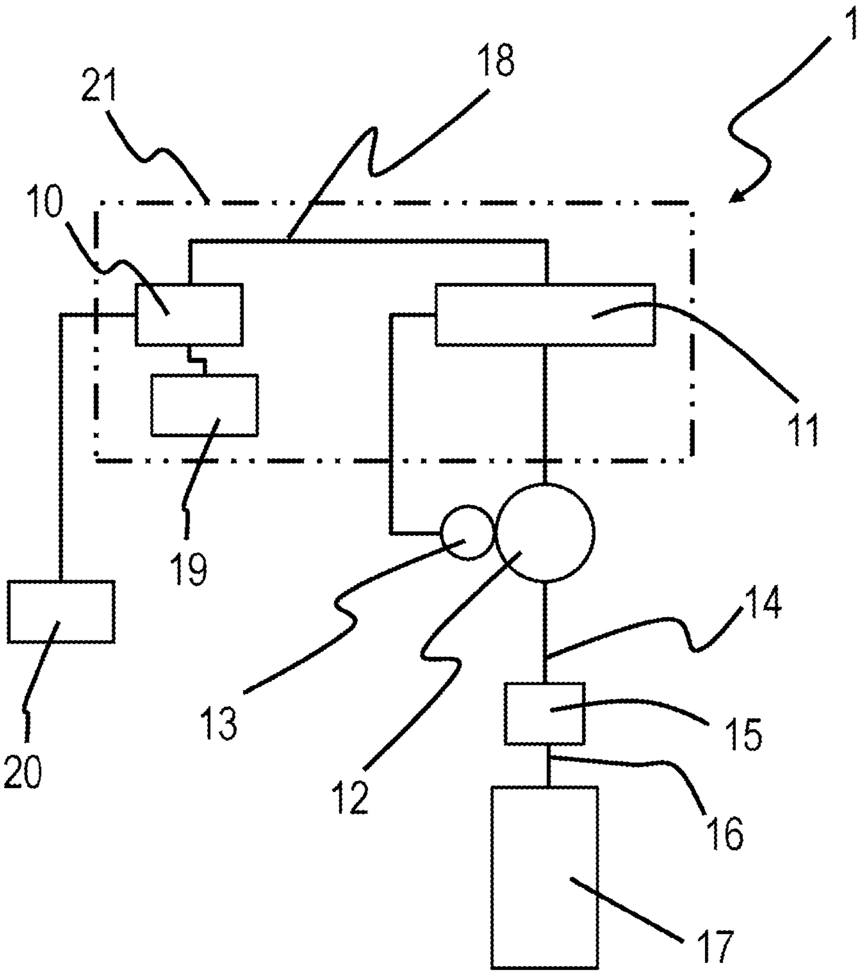
FIG. 2 a schematic representation of a further exemplary embodiment of a switch assembly according to the improved concept.

FIG. 2 shows a schematic representation of a further exemplary embodiment of a switch assembly 1 according to the improved concept, which is based on the embodiment according to FIG. 1.

The switch assembly 1 here optionally has a control cabinet 21, within which the control unit 10, the power section 11 and an optional man-machine interface 19 are arranged. The man-machine interface 19 is connected to the control unit 10 and can serve for control, maintenance or configuration purposes, for example.

The motor 12, the motor shaft 14 the encoder system 13 and/or the gear unit 15 can be located inside or outside the control cabinet 21.

The switch assembly 1, in particular the control unit 10, is coupled to a safety device 20, which comprises, for example, a circuit breaker, in order to disconnect the switch assembly 1 or an item of electrical equipment to which the switch assembly 1 is assigned from a power network, for example in the event of a fault or malfunction of the switch assembly 1.

A switch assembly 1 according to the improved concept increases the operational safety of the servo drive system, the switch and the equipment. This is achieved for example by the use of the programmable safety controller as a control unit and the associated redundancy, the initiation of the safety measure by the power section, and the double position determination.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

REFERENCE SIGNS

1 Switch assembly
2 Servo drive system
3 Control device
4 Feedback system
6 First processor unit/programmable logic controllers
7 Second processor unit/programmable logic controllers
10 Control unit
11 Power section
12 Motor
13 Encoder system
14 Motor shaft
15 Gear unit
16 Drive shaft
17 Switch
18 Bus
19 Man-machine interface
20 Safety device
21 Control cabinet

The invention claimed is:

1. A switch assembly, the switch assembly comprising:
a switch; and a servo drive system for driving the switch, the servo drive system comprising:

a drive shaft connecting the servo drive system to the switch;

a motor configured to drive the switch;

a power section configured to supply power to the motor;

a feedback system, which is configured to:

determine at least two values for an absolute position of the drive shaft generate a feedback signal on the basis of the at least two values; and a control unit which is a programmable safety controller and is configured to:

control the power section depending on at least one desired value;

influence an operation of the motor depending on the feedback signal; and identify the presence of at least one safety-relevant event and, in the case of identifying the presence of the safety-relevant event, to transmit at least one control signal to the power section, wherein the power section is configured to initiate or carry out at least one safety measure depending on the control signal, wherein the control unit comprises a first processor unit and a second processor unit, wherein the control unit is further configured to run a program in order to implement a switching command for the switch, wherein the first processor unit and the second processor unit are configured to run the program in parallel, wherein the control unit is further configured to carry out at least one reconciliation between the first processor unit and the second processor unit whilst the program is being run, wherein the control unit is further configured to initiate a further safety measure depending on a result of the at least one reconciliation, and wherein the further safety measure comprises:

a safe stopping of the motor, a blocking or shutdown of the power section, or a tripping of a circuit breaker that is configured to connect or to disconnect equipment to a power network.

2. The switch assembly as claimed in claim 1, wherein the feedback system is configured to determine each of the at least two values for the position of the drive shaft in accordance with an associated method, wherein the corresponding associated method for determining the at least two values differ from each other.

3. The switch assembly as claimed in claim 1, wherein one of the at least two values for the position of the drive shaft is a first value for an absolute position of the drive shaft.

4. The switch assembly as claimed in claim 1, wherein the feedback system comprises an absolute encoder which is configured and arranged to detect the absolute position of the drive shaft or an absolute position of another shaft connected to the drive shaft and to generate at least one output signal on the basis of the detected position; and wherein the feedback system is configured to determine one of the at least two values for the position of the drive shaft based on the at least one output signal.

5. The switch assembly as claimed in claim 1, wherein the absolute encoder is connected to the drive shaft or the further shaft in an interlocked manner and is additionally connected to the drive shaft or the further shaft in a frictionally engaged or integrally bonded manner.

6. The switch assembly as claimed in claim 1, wherein the control unit is configured to carry out a comparison of a process image of the first processor unit with a process image of the second processor unit whilst the program is being run.

7. The switch assembly as claimed in claim 1, wherein the control unit is designed to check a locking condition of two or more components of the switch assembly.

8. The switch assembly as claimed in claim 1, wherein the control unit has inputs and outputs which are configured as clocked inputs and outputs, respectively.

9. The switch assembly as claimed in claim 8, wherein the control unit is configured to check for the presence of a cross-circuit based on input signals or output signals which are present at the inputs or the outputs, respectively.

10. The switch assembly as claimed in claim 1, wherein the power section is configured to bring the motor to a stop by a first of the at least one safety measures.

11. The switch assembly as claimed in claim 1, wherein the power section is configured to brake or stop the motor in a controlled manner depending on the control signal.

12. The switch assembly as claimed in claim 1, wherein the power section is configured to restrict a speed of a motor shaft of the motor by a second of the at least one safety measure.

13. The switch assembly as claimed in claim 1, wherein the switch is an on-load tap-changer, a diverter switch, a selector, a double reversing change-over selector, a reversing change-over selector, a change-over selector, a circuit breaker, an on-load switch, or a disconnecting switch.

14. The switch assembly as claimed in claim 1, wherein the reconciliation comprises a cyclic comparison of a process image of the first processor unit with a process image of the second processor unit.

15. The switch assembly as claimed in claim 1, wherein each of the first processor unit is a first programmable logic controller and the second processor unit is a second programmable logic controller, and wherein the first programmable logic controller and the second programmable logic controller are configured to use a same process image of inputs and outputs of the control unit.

16. The switch assembly as claimed in claim 1, wherein a hardware of the first processor unit is different from a hardware of the second processor unit.

* * * * *